United States Patent
Heo et al.

(10) Patent No.: US 12,236,552 B2
(45) Date of Patent: Feb. 25, 2025

(54) APPARATUS AND METHOD FOR ANALYZING FISHEYE CAMERA IMAGE

(71) Applicant: IDIS CO., LTD., Daejeon-si (KR)

(72) Inventors: Jun Hyeok Heo, Seongnam-si (KR); Jin Seong Kim, Seongnam-si (KR); Chul Kim, Seongnam-si (KR); Eun Chul Cha, Anyang-si (KR)

(73) Assignee: IDIS CO., LTD., Daejeon-si (KR)

( * ) Notice: Subject to any disclaimer, the term of this patent is extended or adjusted under 35 U.S.C. 154(b) by 239 days.

(21) Appl. No.: 17/474,140

(22) Filed: Sep. 14, 2021

(65) Prior Publication Data

US 2022/0237731 A1  Jul. 28, 2022

(30) Foreign Application Priority Data

Jan. 22, 2021  (KR) .......................... 10-2021-0009699

(51) Int. Cl.
*G06T 3/00* (2024.01)
*G06T 3/047* (2024.01)
*G06T 3/06* (2024.01)
*G06T 5/50* (2006.01)
(Continued)

(52) U.S. Cl.
CPC ............... *G06T 3/047* (2024.01); *G06T 3/06* (2024.01); *G06T 5/50* (2013.01); *G06T 7/11* (2017.01); *G06V 10/25* (2022.01)

(58) Field of Classification Search
CPC ....... G06T 3/0018; G06T 3/0031; G06T 5/50; G06T 7/11; G06T 5/006; G06T 5/005; G06V 10/25; G06V 10/147; G06V 20/52
See application file for complete search history.

(56) References Cited

U.S. PATENT DOCUMENTS

| | | | |
|---|---|---|---|
| 2015/0312498 A1* | 10/2015 | Kawano | G06V 20/40 348/222.1 |
| 2017/0061677 A1* | 3/2017 | Ryu | G06T 11/60 |
| 2017/0337508 A1* | 11/2017 | Bogolea | G06Q 10/087 |

(Continued)

FOREIGN PATENT DOCUMENTS

| | | |
|---|---|---|
| JP | 2018-185552 A | 11/2018 |
| KR | 10-1552600 B1 | 9/2015 |
| KR | 10-1937582 B1 | 4/2019 |

OTHER PUBLICATIONS

Roman, et al., "OmniDetector: With Neural Networks to Bounding Boxes" Pub. May 2018 (Year: 2018).*

(Continued)

*Primary Examiner* — Mekonen T Bekele
(74) *Attorney, Agent, or Firm* — Insight Law Group, PLLC; Seung Lee

(57) ABSTRACT

Disclosed is an image analysis apparatus for analyzing a camera image. The image analysis apparatus for analyzing a camera image segments an input fisheye camera image into segmented images with a preset size field of view and superimposes the segmented images so that some regions overlap, performs dewarping on each of the segmented images, then combines the segmented images on which the dewarping is performed using a preset combination method, generates an analysis image, and detects objects included in the analysis image. In this case, the image analysis apparatus removes a result recognized as a duplicate from a detection result of the object by post-processing.

20 Claims, 6 Drawing Sheets

(51) Int. Cl.
  *G06T 7/11* (2017.01)
  *G06V 10/25* (2022.01)

(56) References Cited

U.S. PATENT DOCUMENTS

2018/0101755 A1* 4/2018 Motohashi ......... G06K 15/1823
2018/0284437 A1* 10/2018 Jones ................... G02B 27/017
2019/0387212 A1* 12/2019 Oh ............................ G06T 7/80

OTHER PUBLICATIONS

Roman Seidel Et al., "OmniDetector: With Neural Networks to Bounding Boxes", arxiv.org, Cornell University Library, 201 Olin Library Cornell University Ithaca, NY 14853, May 22, 2018.
Extended European Search Report mailed Mar. 16, 2022 for European Application No. 21200144.0.
Korean Office Action mailed Jan. 3, 2022 for Korean Application No. 10-2021-0009699.
Janusz Konrad et al: "Overhead fisheye cameras for indoor monitoring: challenges and recent progress", Frontiers in Imaging, vol. 3, Sep. 27, 2024 (Sep. 27, 2024), pp. 1-20, XP093223708, Retrieved from the Internet: URL:https://www.frontiersin.org/journals/imaging/articles/10.3389/fimag. 2024.1387543/pdf.
Seidel Roman et al: "Improved Person Detection on Omnidirectional Images with Non-maxima Supression", arxiv.org, Cornell University Library, 201 Olin Library Cornell University Ithaca, NY 14853, Dec. 6, 2018 (Dec. 6, 2018), pp. 1-8, XP093223972, Retrieved from the Internet: URL:https://arxiv.org/pdf/1805.08503v2.
European Search Report mailed on Nov. 22, 2024 from the European Patent Office for European Application No. 21200144.0.

* cited by examiner

APPARATUS AND METHOD FOR ANALYZING FISHEYE CAMERA IMAGE

CROSS-REFERENCE TO RELATED APPLICATION(S)

This application claims priority from Korean Patent Application No. 10-2021-0009699, filed on Jan. 22, 2021, in the Korean Intellectual Property Office, the disclosure of which is incorporated herein by reference in its entirety.

BACKGROUND

1. Field

The present invention relates to an image analysis technique, and more particularly, to a technique for analyzing a fisheye camera image that is severely distorted.

2. Description of Related Art

With artificial intelligence technology being developed, intelligent image analysis functions are being installed and utilized in actual products such as closed-circuit televisions (CCTVs) and the like. Among cameras used in CCTVs and the like, fisheye cameras that enable omnidirectional monitoring without blind spots are widely used.

Since images obtained by fisheye cameras are severely distorted, it is not possible to accurately recognize objects such as a person and the like using a general intelligent image analysis method. This is because an image captured by a fisheye camera is severely distorted, such as a straight line being bent into a curve or directions toward the ground and the ceiling becoming different directions in the image. Therefore, it is not easy to properly apply the general image analysis method.

In Korean Patent Registration No. 10-1937582 related to a safety system for walkway monitor, a system is proposed in which an image captured by a fisheye camera is segmented according to a photographing direction, distortion of the segmented images is corrected, and then objects included in the images whose distortion is corrected are identified. However, the safety system for walkway monitor may cause a problem in that an object located on a boundary between the segmented images is not recognized or is incorrectly recognized.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is directed to providing an apparatus capable of analyzing a fisheye camera image, which is severely distorted, by performing pre-processing and post-processing without significantly changing a general image analyzer for analyzing camera images.

In one general aspect, an image analysis apparatus for analyzing a camera image is an apparatus for analyzing a fisheye camera image and includes a pre-processing unit, an image analysis unit, and a post-processing unit.

The pre-processing unit may segment an input fisheye camera image into segmented images with a preset size field of view and superimpose the segmented images so that some regions overlap. Further, the pre-processing unit may perform dewarping on each of the segmented images, then combine the segmented images on which the dewarping is performed using a preset combination method, and generate an analysis image The image analysis unit may receive the analysis image and detect an object.

The post-processing unit may remove a result recognized as a duplicate from a detection result of the object of the image analysis unit.

The post-processing unit may determine a duplicate object on the basis of coordinates of a region of the object in the fisheye lens camera image and remove the result recognized as the duplicate from the detection result of the object or the post-processing unit may compare the images of the detected object to determine similarity of the images of the object and remove the result recognized as the duplicate.

The image analysis apparatus for analyzing a camera image may further include a user interface unit configured to receive a size of a field of view to be segmented and a method of combining segmented images from a user and set the size and the method.

Further, the user interface unit may set a region of interest (ROI) in the fisheye lens camera image according to a user's input. In this case, the pre-processing unit may segment the input image with the preset size field of view so that boundary portions of the ROI overlap.

Other features and aspects will be apparent from the following detailed description, the accompanying drawings, and the claims.

Figure 1:
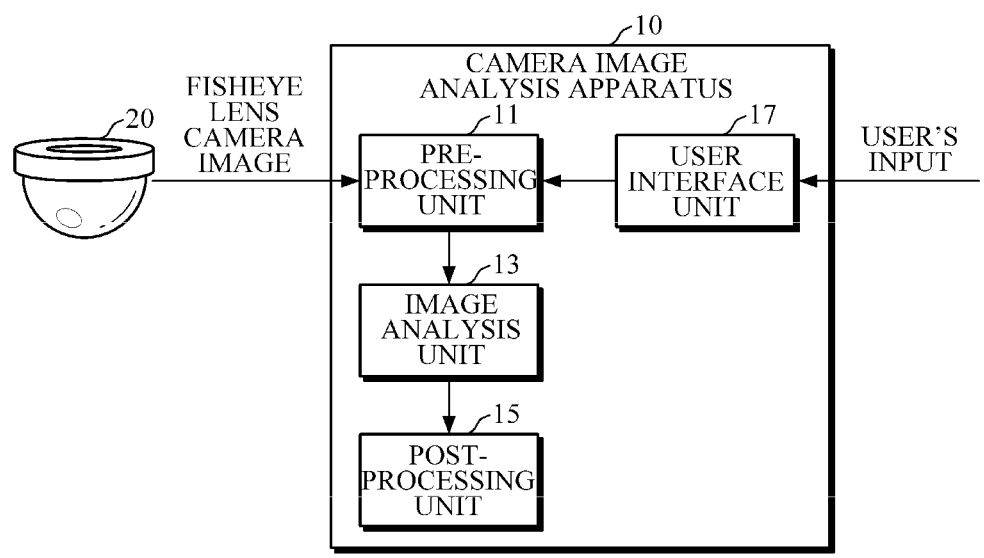
FIG. 1 is a block diagram of an image analysis apparatus for analyzing a camera image of the present invention.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The above-described aspects and additional aspects are embodied through embodiments described with reference to the accompanying drawings. It will be understood that components of each of the embodiments may be combined in various ways within one embodiment unless otherwise stated or there is a contradiction between them. In some cases, each block in a block diagram may represent a physical part, and in other cases, each block in the block diagram may be a logical representation of a portion of a function of one physical part or may be a logical representation of a function across a plurality of physical parts. In some cases, a block or an entity of a portion of a block may be a set of program instructions. All or some of the blocks may be implemented in hardware, software, or a combination thereof.

FIG. 1 is a block diagram of an image analysis apparatus for analyzing a camera image of the present invention. An image analysis apparatus 10 for analyzing a camera image according to an aspect of the present invention is an apparatus for analyzing an image captured by a fisheye camera 20 and includes a pre-processing unit 11, an image analysis unit 13, and a post-processing unit 15.

The image analysis apparatus 10 is configured as a kind of computing device having a processor and a memory and may be used in an image surveillance system for monitoring people or objects in a specific region. The image analysis apparatus 10 for analyzing a camera image analyzes images captured by a camera installed in an indoor place or the like. In this case, since the image analysis apparatus 10 analyzes images within a visual range that the camera can acquire, the image analysis apparatus 10 uses a single camera with a relatively wide-angle lens or a plurality of cameras to recognize an object such as a person or the like.

Figure 2:
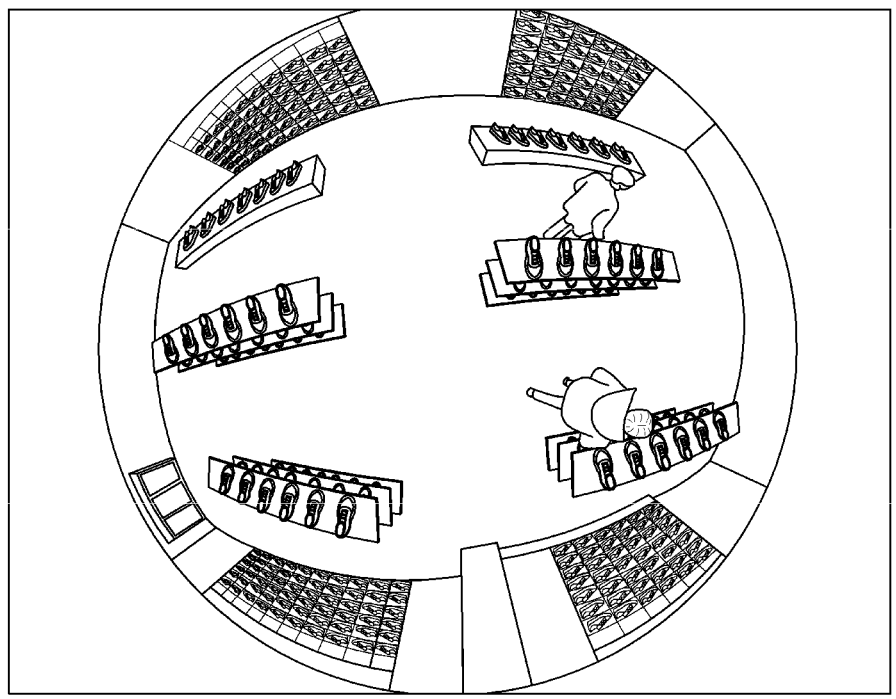
FIG. 2 illustrates an example of an image captured by a fisheye camera which will be analyzed by the image analysis apparatus for analyzing a camera image.

The image analysis apparatus 10 may use a plurality of cameras in order to monitor a wide range, but in this case, the burden of monitoring at one time is increased, and thus the image analysis apparatus 10 may use a single camera with a wide angle of view. The fisheye camera 20 is a camera capable of photographing from a front to a side or rear thereof through a fisheye lens, which is a kind of wide-angle lens having an angle of view of 180 degrees to 360 degrees. Therefore, the image of a wide range may be analyzed using a single fisheye camera 20 instead of a plurality of cameras. FIG. 2 illustrates an example of an image captured by a fisheye camera which will be analyzed by the image analysis apparatus 10 for analyzing a camera image. In the example illustrated in FIG. 2, the image captured by the fisheye camera is a 360-degree image around the camera. However, unlike general cameras, the fisheye camera provides images with different degrees of distortion according to a distance from the camera.

Figure 3:
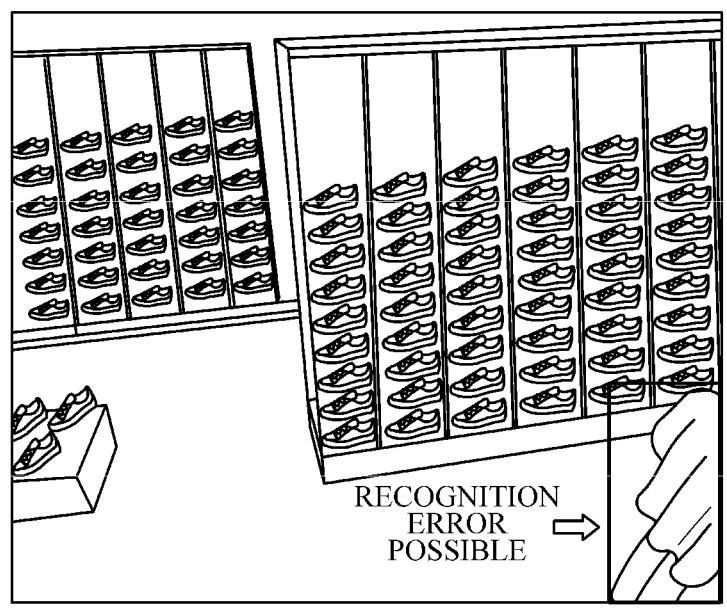
FIG. 3 illustrates an example of an object located on a boundary of a segmented image where an error in recognition of the object may occur.

In general, the fisheye camera image may be analyzed after distortion of the image is corrected and flattened. Before the distortion of the fisheye camera image is corrected, the fisheye camera image is segmented into images with an appropriate field of view (FoV) and dewarping is performed on each of the segmented images of the fisheye camera image. However, in the process of segmenting the image, when there is an object disposed on a boundary between the segmented images, the corresponding object may not be recognized. FIG. 3 illustrates an example of an object located on a boundary of the segmented image where an error in recognition of the object may occur.

In order to prevent the object disposed on the boundary between the segmented images from not being recognized or from being recognized incorrectly, the pre-processing unit 11 segments the input fisheye camera image into the images with an FoV of a preset size and superimposed the images so that some regions of the input fisheye camera image overlap. That is, the pre-processing unit 11 may form the segmented images by segmenting the fisheye camera image into the images with the FoV so that some regions overlap, and even when the object is located on the boundary of one segmented image and a portion of the object is cut off, the pre-processing unit 11 may allow the object to be completely displayed in another segmented image.

Further, the pre-processing unit 11 performs dewarping on each of the segmented images with the preset size FoV. In the performance of dewarping on the fisheye camera image, three-dimensional coordinates of the image are set, a distance from the center of the camera projected on these coordinates for each direction in which the image is formed is set using a function of a positive angle, and the image is decomposed so that a flattened image is derived. In this case, the projection is divided into an equidistant projection, an equisolid angle projection, a stereographic projection, and the like according to the method in which the center of the camera is projected. A dewarping algorithm of the fisheye camera is a well-known technology, and thus a detailed description thereof will be omitted.

Figure 4:
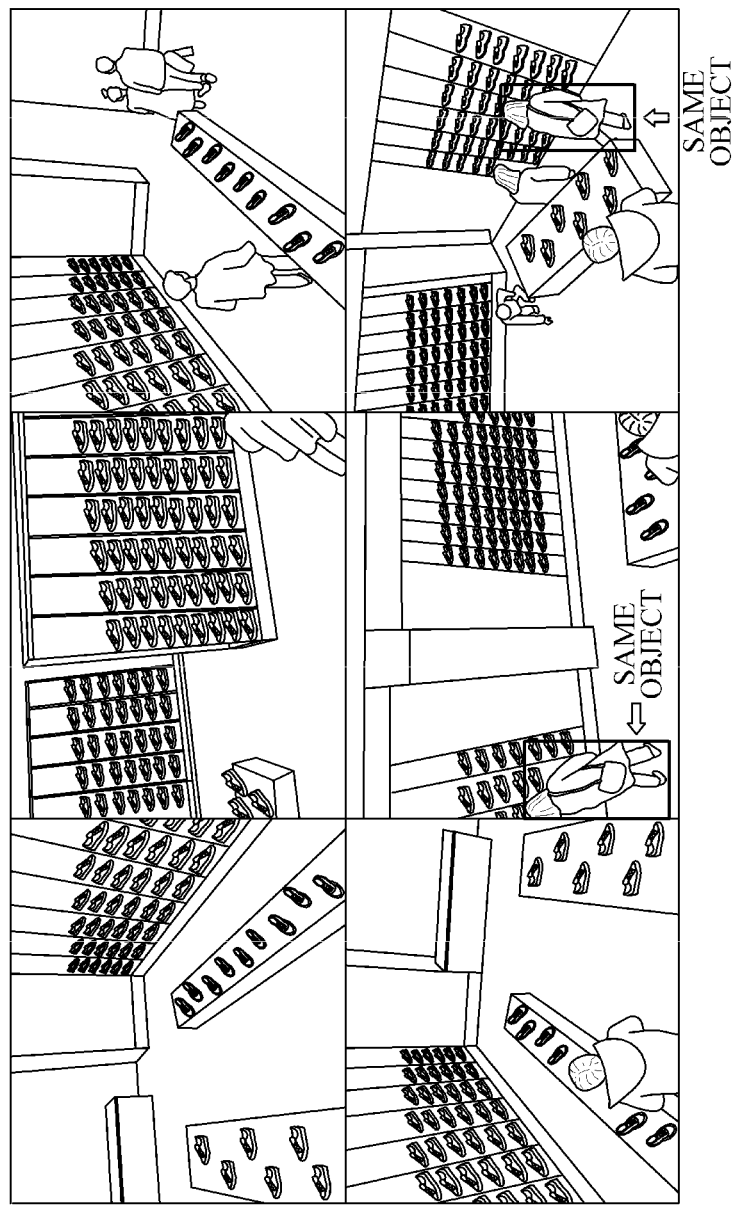
FIG. 4 illustrates an example of an analysis image generated by the image analysis apparatus for analyzing a camera image of the present invention from the image of FIG. 2.

Since the image analysis apparatus 10 of the present invention uses a general image analyzer with minimum changes, the image analysis apparatus 10 makes a single image and then analyzes the image instead of individually analyzing the segmented images on which the dewarping is performed. Therefore, the pre-processing unit 11 generates an analysis image by combining the images on which the dewarping is performed using a preset combination method. The analysis image is an image input to the image analyzer to recognize an object. FIG. 4 illustrates an example of the analysis image generated by the image analysis apparatus for analyzing a camera image of the present invention from the image of FIG. 2. In the example of FIG. 4, the image captured by the fisheye camera is segmented into images with six fields of view, and after the image is segmented so that some regions overlap, the dewarping is performed on each segmented image and the segmented images are combined into a 3×2 image to generate one image. In the example of FIG. 4, it can be seen that some regions of each segmented image on which the dewarping is performed overlap. The 3×2 combination image is one example, and as another example, the camera image is segmented into images with eight fields of view and an analysis image may be generated as a 4×2 combination image.

The image analysis unit 13 receives the analysis image and detects objects included in the images. The image analysis unit 13 uses a conventional image analyzer in general use without significantly changing the image analyzer. Therefore, an image analysis algorithm used by the image analysis unit 13 may be a deep learning algorithm. As an example, the image analysis algorithm may include a FAST object search algorithm, such as You Only Look Once (YOLO), Single Shot MultiBox Detector (SSD), or the like. The image analysis unit 13 may display a range of an object generally recognized as a bounding box.

As illustrated in FIG. 4, some objects marked with bounding boxes may appear as duplicates in the segmented images and the corresponding objects may be recognized as duplicates by the image analysis unit 13. In order to solve the problem of recognizing duplicate objects that is caused by segmenting the fisheye camera image so that some regions overlap, the post-processing unit 15 removes a result recognized as a duplicate from a detection result of the object of the image analysis unit 13.

According to an aspect of the present invention, the post-processing unit 15 may determine a duplicate object on the basis of coordinates of a region of the object in the fisheye lens camera image and remove the result recognized as the duplicate from the detection result of the object. That is, the post-processing unit 15 may process the object in which large portions overlap on the coordinates of the fisheye camera image with respect to the same type of object as one object. Therefore, the coordinates of the bounding box indicating the object recognized by the image analysis unit 13 may be included as coordinates of the fisheye camera image. According to an aspect of the present invention, the coordinates of the segmented image of the bounding box may be converted into the coordinates of the fisheye camera image and whether the object is duplicated may be determined based on the converted coordinates.

According to an aspect of the present invention, the post-processing unit 15 may compare the images of the detected object to determine similarity of the images of the object and remove the result recognized as the duplicate. The post-processing unit 15 may determine the similarity of the images of the object using a data re-identification algorithm.

According to an additional aspect of the present invention, the image analysis apparatus 10 for analyzing a camera image may further include a user interface unit 17 which receives a size of an FoV to be segmented and a method of combining segmented images from a user and sets the size and method. The fisheye camera image may be segmented according to the preset size of the FoV or may be segmented according to the size of the FoV that is input by the user through the user interface unit 17. However, even when the image is segmented according to the size of the FoV that is input by the user, the image is segmented so that some regions overlap. Further, the user may set a combination method in which an analysis image is generated by combining the segmented images, through a user interface.

The user may set a region of interest (ROI) in the fisheye camera image through the user interface unit 17. In this case, the pre-processing unit 11 segments the fisheye camera image with the FoV of the set size so that boundary portions of the ROI overlap. Further, the user may set one or more ROIs.

Figure 5:
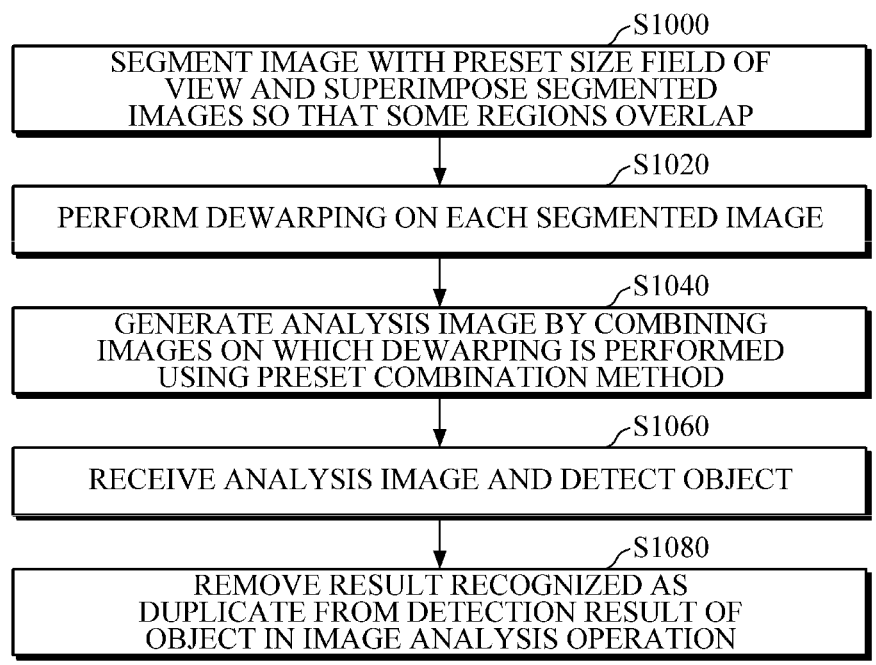
FIG. 5 is flowchart of a method of analyzing an image according to an embodiment of the present invention.

FIG. 5 is flowchart of a method of analyzing an image according to an embodiment of the present invention. The method of analyzing an image according to the embodiment of the present invention in which a fisheye camera image is analyzed includes an image segmentation operation, a dewarping operation, an image combination operation, an image analysis operation, and a post-processing operation.

Each operation of the method of analyzing an image consists of a set of computer instructions in which at least some of its functions are performed in a kind of computing device having a processor and a memory.

The fisheye camera image is the distorted image as in the form of the example of FIG. 2. It is difficult to analyze the image without correcting and flattening the image, and in general, the image is segmented with an appropriate FoV before the dewarping is performed on the fisheye camera image, and the dewarping is performed on each of the segmented fisheye camera images.

Unlike the method of analyzing a fisheye camera image as illustrated in FIG. 3, in order to prevent a recognition error of the object disposed on the boundary between the segmented images in the image segmentation process, the image segmentation operation includes segmenting, by the image analysis apparatus 10, the image with an FoV of a preset size and superimposing the segmented images so that some regions overlap (S1000). That is, in the image segmentation operation, the image analysis apparatus 10 may form the segmented images by segmenting the image with the FoV so that some regions overlap, and even when the object is located on the boundary of one segmented image and a portion of the object is cut off, the image analysis apparatus 10 may allow the object to be completely displayed in another segmented image.

The dewarping operation includes performing, by the image analysis apparatus 10, dewarping on each of the segmented images with the preset size FoV (S1020). A dewarping algorithm used in this case is a well-known technique, and thus a detailed description thereof will be omitted.

The image combination operation includes generating, by the image analysis apparatus 10, an analysis image by combining the images on which the dewarping is performed using a preset combination method (S1040). Since the image analysis apparatus 10 of the present invention uses a general image analyzer with minimum changes, the image analysis apparatus 10 makes a single image and then analyzes the image instead of individually analyzing the segmented images on which the dewarping is performed. FIG. 4 illustrates an example of the analysis image generated by the image analysis apparatus 10 for analyzing a camera image of the present invention from the image of FIG. 2, in which the image captured by the fisheye camera is segmented into images with six fields of view, and after the image is segmented so that some regions overlap, the dewarping is performed on each segmented image and the segmented images are combined into a 3×2 image to generate one image. In the method of combining the image, a size of an FoV to be segmented and a method of combining segmented images may be received from the user through a user interface and set.

The image analysis operation includes receiving, by the image analysis apparatus 10, the analysis image and detecting objects included in the images (S1060). A conventional image analyzer in general use is used as an image analysis function used in the image analysis operation without significantly changing the image analyzer. Therefore, an image analysis algorithm that is used by the image analysis operation may be a deep learning algorithm. As an example, the image analysis algorithm may include a FAST object search algorithm, such as YOLO, SSD, or the like. In the image analysis operation, a range of an object generally recognized as a bounding box may be displayed.

In order to solve the problem that some objects marked with bounding boxes appear as duplicates in the segmented image as illustrated in FIG. 4, the post-processing operation includes removing, by the image analysis apparatus 10, a result recognized as a duplicate from the detection result of the object in the image analysis operation (S1080).

According to an aspect of the present invention, the post-processing operation includes determining a duplicate object on the basis of coordinates of the region of the object in the fisheye lens camera image in the detection result of the object and removing the result recognized as the duplicate. Therefore, the coordinates of the bounding box indicating the object recognized in the image analysis operation may be included as coordinates of the fisheye camera image. According to an aspect of the present invention, the coordinates of the segmented image of the bounding box may be converted into the coordinates of the fisheye camera image and whether the object is duplicated may be determined based on the converted coordinates.

According to an aspect of the present invention, the post-processing operation includes comparing the images of the detected object to determine similarity of the images of the object and removing the result recognized as the duplicate. In the post-processing operation, the similarity of the images of the object may be determined using a data re-identification algorithm.

Figure 6:
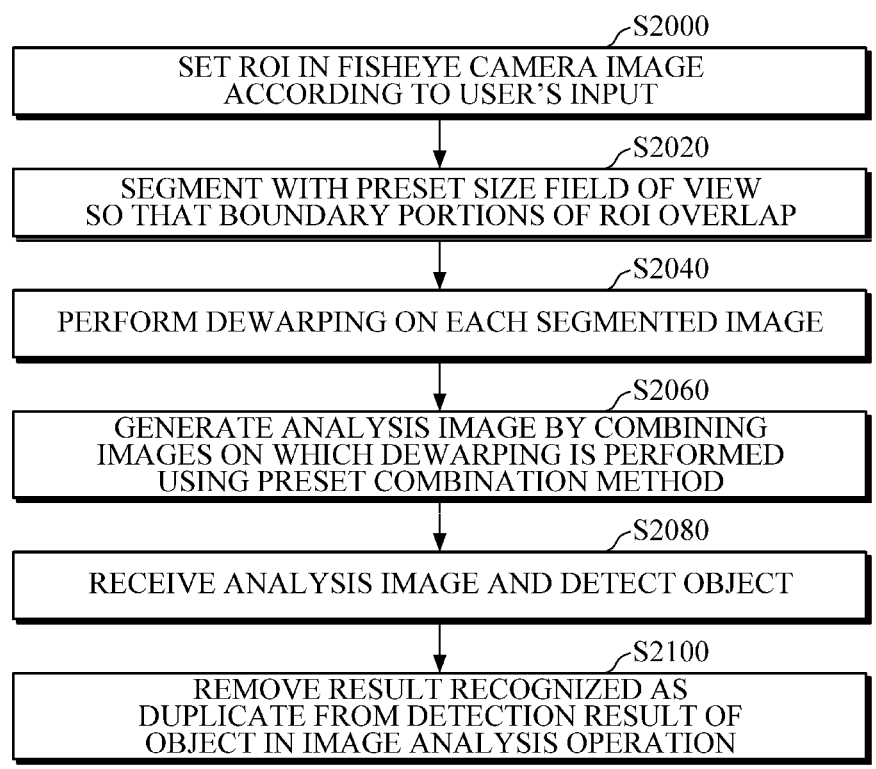
FIG. 6 is flowchart of a method of analyzing an image by setting a region of interest (ROI) according to another embodiment of the present invention.

FIG. 6 is flowchart of a method of analyzing an image by setting an ROI according to another embodiment of the present invention. A procedure illustrated in FIG. 6 is a procedure in which an ROI setting operation is added to the procedure illustrated in FIG. 5. According to another embodiment of the present invention, the method of analyzing an image includes an ROI setting operation S2000, an image segmentation operation S2020, a dewarping operation S2040, an image combination operation S2060, an image analysis operation S2080, and a post-processing operation S2100.

The dewarping operation, the image combination operation, the image analysis operation, and the post-processing operation are the same as those in the procedure illustrated in FIG. 5, and thus descriptions thereof will be omitted.

The ROI setting operation includes setting an ROI in the fisheye camera image according to a user's input through a user interface (S2000).

In this case, in the image segmentation operation, the fisheye camera image is segmented with an FoV of a set size so that boundary portions of the ROI overlap (S2020). Further, the user may set one or more ROIs.

According to the image analysis apparatus for analyzing a camera image of the present invention, a fisheye camera image that is severely distorted can be analyzed by performing pre-processing and post-processing without significantly changing a general image analyzer for analyzing camera images.

While the present invention has been described with reference to the embodiments and accompanying drawings, the present invention is not limited thereto. It should be understood that various modifications from the embodiments may be apparent to those skilled in the art. Appended claims are intended to include such modifications.

What is claimed is:

1. An image analysis apparatus for analyzing a camera image, which analyzes a fisheye lens camera image, the image analysis apparatus comprising:
    a memory; and
    a processor, wherein the processor, when executing program instructions stored in the memory, is configured to perform:
    a pre-processing operation of segmenting an input image into segmented images with a preset size field of view so that some regions of the displayed image overlap in the segmented images, performing dewarping on each of the segmented images, then combining the segmented images on which the dewarping is performed using a preset combination method, and to generate an analysis image;
    an image analysis operation of receiving the analysis image and detecting an object; and
    a post-processing operation of removing a result recognized as a duplicate from a detection result of the object of the image analysis operation,
    wherein the analysis image is generated by concatenating the segmented images on a predetermined grid,
    wherein the segmented images are images of different areas of a fisheye lens camera image, and
    wherein the post-processing operation includes determining a duplicate object on the basis of coordinates of a region of the object in the fisheye lens camera image converted from coordinates of the segmented image of a bounding box and removing the result recognized as the duplicate from the detection result of the object.

2. The image analysis apparatus of claim 1, wherein the post-processing operation further includes comparing the images of the detected object to determine similarity of the images of the object and removing the result recognized as the duplicate.

3. The image analysis apparatus of claim 1, wherein the processor is further configured to perform: a user interface operation of receiving a size of a field of view to be segmented and a method of combining segmented images from a user and setting the size and the method.

4. The image analysis apparatus of claim 3, wherein:
    the user interface operation comprises setting a region of interest (ROI) in the fisheye lens camera image according to a user's input; and
    the pre-processing operation comprises segmenting the input image with the preset size field of view so that boundary portions of the ROI overlap.

5. The image analysis apparatus of claim 1, wherein at least a part of the object is shown in an overlapped region in at least two of the segmented images.

6. The image analysis apparatus of claim 5, wherein the analysis image is different from any of the at least two of the segmented images.

7. The image analysis apparatus of claim 5, wherein the analysis image comprises a part of one of the at least two of the segmented images and a part of the other of the at least two of the segmented images.

8. The image analysis apparatus of claim 1, wherein any portion of the input image belongs to one or two segmented images.

9. The image analysis apparatus of claim 1, wherein the analysis image comprises a plurality of dewarped segmented images which are concatenated on the predetermined grid, the object belongs to at least two dewarped segmented images, and one of the at least two dewarped segmented images completely displays the object.

10. The method of claim 1, wherein each point in the fisheye lens camera image is converted to at least one point in one of the segmented images.

11. The method of claim 1, wherein each point in any of the segmented images is converted to one point in the analysis image.

12. The method of claim 1, wherein every point in the fisheye lens camera image is converted to at least one point in the analysis image.

13. A method of analyzing an image using an image analysis apparatus for analyzing a camera image, in which the image analysis apparatus analyzes a fisheye lens camera image, the method comprising:
    an image segmentation operation of segmenting an input image into segmented images with a preset size field of view so that some regions of the displayed image overlap in the segmented images;
    a dewarping operation of performing dewarping on each of the segmented images;
    an image combination operation of combining the segmented images on which the dewarping is performed using a preset combination method to generate an analysis image;

an image analysis operation of receiving the analysis image and detecting an object; and a post-processing operation of removing a result recognized as a duplicate from a detection result of the object in the image analysis operation, wherein the analysis image is generated by concatenating the segmented images on a predetermined grid, wherein the segmented images are images of different areas of a fisheye lens camera image, and wherein the post-processing operation includes determining a duplicate object on the basis of coordinates of a region of the object in the fisheye lens camera image converted from coordinates of the segmented image of a bounding box and removing the result recognized as the duplicate from the detection result of the object.

14. The method of claim 13, wherein the post-processing operation further includes comparing the images of the detected object to determine similarity of the images of the object and removing the result recognized as the duplicate.

15. The method of claim 13, further comprising a region of interest (ROI) setting operation of setting an ROI in the fisheye lens camera image according to a user's input, wherein the image segmentation operation includes segmenting the input image with the preset size field of view so that boundary portions of the ROI overlap.

16. The method of claim 13, wherein at least a part of the object is shown in an overlapped region in at least two of the segmented images.

17. The method of claim 16, wherein the analysis image is different from any of the at least two of the segmented images.

18. The method of claim 16, wherein the analysis image comprises a part of one of the at least two of the segmented images and a part of the other of the at least two of the segmented images.

19. The method of claim 13, wherein any portion of the input image belongs to one or two segmented images.

20. The method of claim 13, wherein the analysis image comprises a plurality of dewarped segmented images which are concatenated on the predetermined grid, the object belongs to at least two dewarped segmented images, and one of the at least two dewarped segmented images completely displays the object.

\* \* \* \* \*